United States Patent [19]

Ichikawa et al.

[11] Patent Number: 5,220,687
[45] Date of Patent: Jun. 15, 1993

[54] RADIO RECEIVER HAVING SWITCH FOR SWITCHING BETWEEN A WIDE FILTER AND A NARROW FILTER

[75] Inventors: Toshihito Ichikawa; Koichi Kasa; Kiichiro Akiyama, all of Saitama, Japan

[73] Assignee: Pioneer Electronic Corporation, Tokyo, Japan

[21] Appl. No.: 706,610

[22] Filed: May 28, 1991

[30] Foreign Application Priority Data

| May 30, 1990 | [JP] | Japan | 2-138272 |
| May 30, 1990 | [JP] | Japan | 2-138273 |
| May 30, 1990 | [JP] | Japan | 2-138274 |
| May 30, 1990 | [JP] | Japan | 2-138275 |
| May 30, 1990 | [JP] | Japan | 2-138276 |
| Jun. 29, 1990 | [JP] | Japan | 2-169838 |
| Jun. 29, 1990 | [JP] | Japan | 2-169840 |

[51] Int. Cl.[5] ............................. H04B 1/06
[52] U.S. Cl. ..................... 455/254; 455/266; 455/306
[58] Field of Search .......... 455/65, 174.1, 177.1, 455/200.1, 213, 254, 266, 268, 340, 133, 135, 303, 306

[56] References Cited

U.S. PATENT DOCUMENTS

| 3,909,735 | 9/1975 | Anderson et al. | 455/266 |
| 4,124,817 | 11/1978 | Takahashi | 455/266 |
| 4,356,567 | 10/1982 | Eguchi et al. | 455/200.1 |

FOREIGN PATENT DOCUMENTS

| 59-6015 | 2/1984 | Japan . | |
| 0212038 | 10/1985 | Japan | 455/266 |
| 0212039 | 10/1985 | Japan | 455/266 |
| 0314028 | 12/1988 | Japan | 455/266 |

Primary Examiner—Reinhard J. Eisenzopf
Assistant Examiner—Andrew Faile
Attorney, Agent, or Firm—Sughrue, Mion, Zinn, Macpeak & Seas

[57] ABSTRACT

A radio receiver is disclosed having a wide filter and a narrow filter, each of which is connected with the front end and outputs an intermediate frequency signal. To the output of the filters are connected first and second detectors, respectively. A subtracter receives the outputs of the detectors and subtracts one from the other. A switch receives the output of the subtracter and directs the outputs of detectors in such a way that the switch is switched to a first position for directing the demodulated output from the first detector to a following circuit when the difference is below a reference level, and to a second position for directing the demodulated output from the second detector to the following circuit when the difference is above the reference level.

10 Claims, 15 Drawing Sheets

RADIO RECEIVER HAVING SWITCH FOR SWITCHING BETWEEN A WIDE FILTER AND A NARROW FILTER

BACKGROUND OF THE INVENTION

1. Field of the Invention

The present invention relates to a radio receiver, and more particularly to improvements of the signal-to-noise ratio of an audio output of an on-vehicle radio receiver.

2. Prior Art

Generally speaking, when the input to a receiver through a receiving antenna decreases, the noise in the receiver output increases deteriorating the signal-to-noise ratio. Japanese Utility Model Publication No. 59-6015 in FIG. 14 discloses a receiver having two filters in the IF stage; a wide filter and a narrow filter. The outputs of these two filters are selectively supplied to an FM demodulator such that the IF signal from the wide filter is normally demodulated while the IF signal from the narrow filter is demodulated when the signal strength to the receiver decreases. This type of conventional on-vehicle receiver may suffer from the problem that when the signal strength of an adjacent station becomes strong compared to that of the station presently being received while the vehicle is running, the signal of the adjacent station interferes with the signal currently being received.

Even if the desired station is not interfered with by an adjacent station, the frequent changes in field strength of the station currently being received causes a frequent switching operation between the narrow filter and wide filter, thereby causing producing poor quality of sound.

If the narrow and wide filters do not have the same frequency characteristics, pulse noise such as an ignition noise cannot be removed. In which case, the receiver suffers from the problem that the signal output is frequently switched between the wide filter and narrow filter.

If the signal currently being received is overmodulated or multipath noise exists, the difference in gain and bandwidth between the wide filter and narrow filter results in the difference in output between the two filters, which leads to the malfunction in switching between the two filters.

A large amount of multipath noise may cause an interfering signal to become stronger than the signal currently being received. Then, the strongly interfering signal may actually interfere the signal currently being received. Thus, the D/U ratio varies very frequently causing a frequent switching operation between the wide filter and narrow filter.

When in the seek operation, where stations in the frequency band are scanned to automatically select a desired station, the strength of incoming-signals are often weak resulting in a difference in signal level between the wide and narrow filters. If the receiver is designed to operate such that IF signals passing through the two filters are compared, the receiver determines there is interference if the difference between the two IF signals is above a predetermined level. A difference above a predetermined level that occurs during the seek operation, is interpreted as being due to interference. Thus, the narrow filter is accidentally selected rather than the wide filter. Furthermore, the detected outputs of the two IF signal paths are unstable and different in level for a short time after seek operation is over. Thus, there is the problem that the narrow filter is selected without regard to whether interference exists.

The difference in gain between the wide and narrow filters causes the degree of muting the audio signal when the two filters are switched from one to another, resulting in uncomfortable listening condition. Conventionally, the muting circuit and detector are fabricated in different integrated circuits, leading to complex circuit configuration and high manufacturing costs.

When the receiver incoming signal decreases and the receiver is interfered by an adjacent station, the S-meter is deflected by the interfering signal. Thus, automatic selection of stations by the aid of the RDS system is not performed properly leaving the receiver output interfered.

In an RDS receiver shown in FIG. 15, the frequencies of network stations are stored in the RDS decoder in addition to the station currently being received. When the signal strength of the station currently being received decreases, the S-meter signal level also decreases. The decreased S-meter signal is supplied to the RDS decoder which in turn outputs the frequency of an alternative network-station to the PLL. If the new station is also weak in signal level, then the decoder outputs the frequency of another alternative station. In this manner, network stations are searched until a station of reasonably strong signal level is received. If the receiver receives interference by the adjacent station due to the decrease of signal strength of the station currently being received, the S-meter is deflected by the interfering signal, failing to properly detect the decrease in level of the desired signal. Thus, the interference with the receiver remains.

SUMMARY OF THE INVENTION

An object of the invention is to provide a radio receiver in which when an interfering signal comes into the receiver, the IF signal outputs of the wide and narrow filters are selectively supplied to the FM demodulator by automatically switching between the two filters so as to prevent interference.

Another object of the invention is to provide a radio receiver in which when the signal strength of the station currently being received decreases, the narrow filter is automatically selected and remains selected so that the IF signals are not frequently switched between the two filters.

Still another object of the invention is to provide a radio receiver in which even when pulse noise is occurring frequently, the wide and narrow filters are not frequently switched from one to another.

Yet another object of the invention is to provide a radio receiver in which the erroneous detection of overmodulation or multipath noise are eliminated, and to provide a radio receiver in which when multipath noise exists, filters remain selected for a longer time so that the filters are not frequently switched from one to another.

A further object of the invention is to provide a radio receiver in which when interference occurs, the narrow filter is immediately selected to prevent an interfered audio output from being outputted, and when seek operation is being performed, the wide filter is selected to ensure seek operation.

A still further object of the invention is to provide a radio receiver in which the muting circuit is implemented in a single circuit to simplify circuit design and the muting circuit is controlled by the S-meter output from the detector connected to the wide filter.

Yet a further object of the invention is to provide a radio receiver in which even when the receiving condition of the receiver becomes poor due to interference, the best station can be received such that the automatic selection of network-stations is achieved in a good receiving condition.

A radio receiver comprises a wide filter and a narrow filter, each of which is connected with the front end and outputs an intermediate frequency signal. To the output of the filters are connected a first and second detectors, respectively. A subtracter receives the outputs of the detectors and subtracts one from the other. A switch receives the output of the subtracter and directs the outputs of detectors in such a way that the switch is switched to a first position for directing the demodulated output from the first detector to a following circuit when the difference is below a reference level, and to a second position for directing the demodulated output from the second detector to the following circuit when the difference is above the reference level.

BRIEF DESCRIPTION OF THE DRAWINGS

Features and other objects of the invention will be more apparent from the description of the preferred embodiment with reference to the accompanying drawings in which.

DESCRIPTION OF THE PREFERRED EMBODIMENTS

First embodiment

Figure 1:
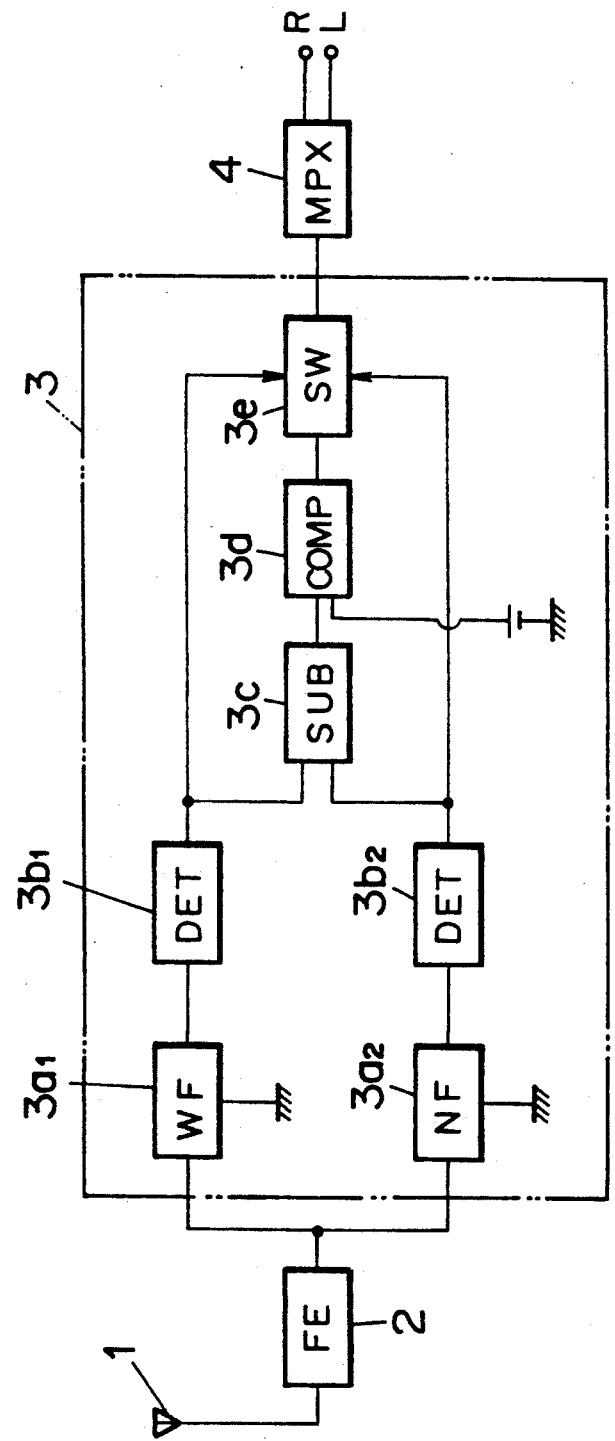
FIG. 1 shows a first embodiment of a radio receiver according to the present invention.

FIG. 1 shows a radio receiver according to the present invention. A radio wave arriving at an antenna 1 is directed to a front end 2 made up of a high frequency amplifier, mixer, and local oscillator. The radio wave of a desired frequency is selected, amplified, and then converted into an intermediate frequency signal. The intermediate frequency signal is then supplied to both a wide filter 3a1 and narrow filter 3a2. The output of the wide filter 3a1 is demodulated by a detector 3b1 and the demodulated signal is supplied to a subtracter 3c. The output of the narrow filter 3a2 is demodulated by 3b2 and the demodulated signal is supplied to the subtracter 3c. The subtracter 3c subtracts one signal from the other so as to output the difference between the two to a comparator 3d. The comparator 3d compares the signal from subtracter 3c with a predetermined reference level to produce a signal by which a following switch 3e is driven. The outputs of the detectors 3b1 and 3b2 are selectively directed by a switch 3e to a multiplex circuit 4 where the signal is demodulated into the left and right stereo audio signals.

When the receiver is not interfered with by an adjacent station, the outputs of the wide filter 3a1 and narrow filter 3a2 are of substantially the same level and therefore the output of subtracter 3c is very small. Thus, the comparator 3d provides no output and the switch 3e remains switched to the position of detector 3b1 so as to direct the signal from the detector 3b1 to the multiplex circuit 4.

Figure 2A:
FIG. 2A shows the output of the wide filter when it is interfered with by an adjacent station.
Figure 2B:
FIG. 2B shows the output of the narrow filter.

When the receiver is interfered with by an adjacent station, the output of detector 3b1 suffers from interference as shown in FIG. 2A while the output of detector 3b2 has no interference as shown in FIG. 2B. Thus, the subtracter 3c provides the difference between the outputs of detectors 3b1 and 3b2. The output of the subtracter 3c is compared by the comparator 3d with the reference level. If the output of subtracter 3c is greater than the reference level, then the comparator 3d provides an output so that the switch 3e directs the output of narrow filter 3a2 to the multiplex circuit 4. In this manner, only the desired station can be received without interference.

Second embodiment

Since the delay time of the narrow filter 3a2 is longer than that of the wide filter 3a1, the signals from the two filters are different in phase. Thus, a difference the demodulated signal will appear at the output of subtracter 3c in addition to the interference component.

Figure 3:
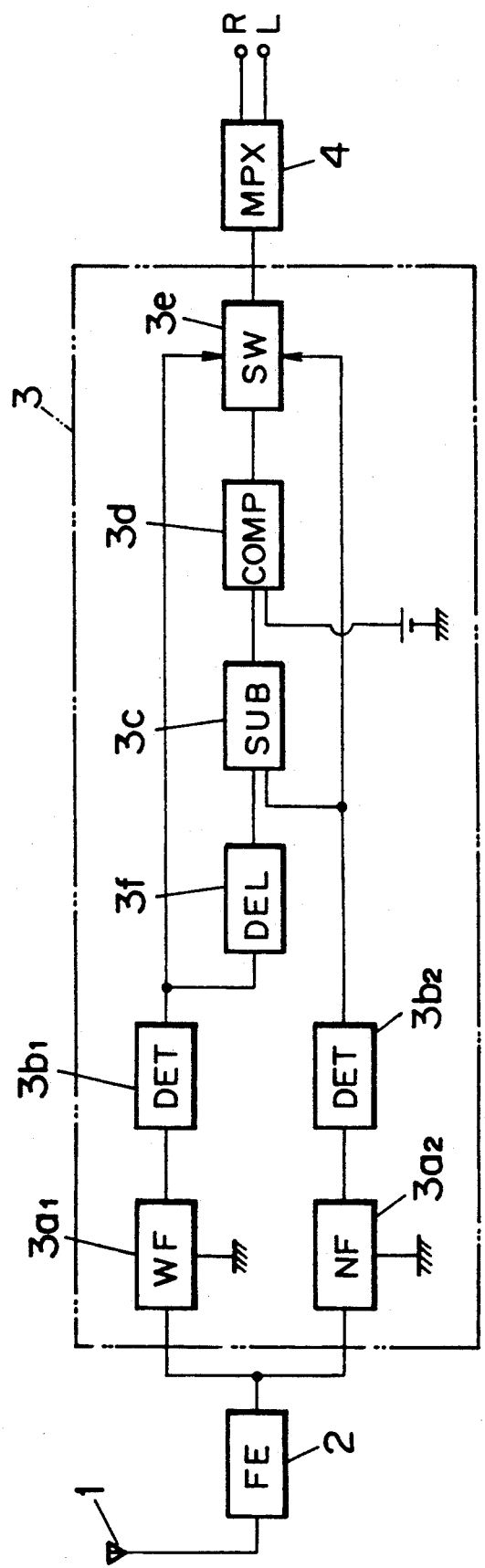
FIG. 3 shows a second embodiment of the invention.

FIG. 3 shows a second embodiment of the invention in which a delay circuit 3f consisting of a capacitor and a resistor is inserted between the detector 3b1 and the subtracter 3c in FIG. 1. The signals supplied to the subtracter 3c are substantially in phase at the input of the subtracter 3c so that the difference the demodulated signal will not appear at the output of subtracter. Thus, the interference component is properly detected so as to switch between the wide filter 3a1 and narrow filter 3a2.

Third embodiment

Figure 4A:
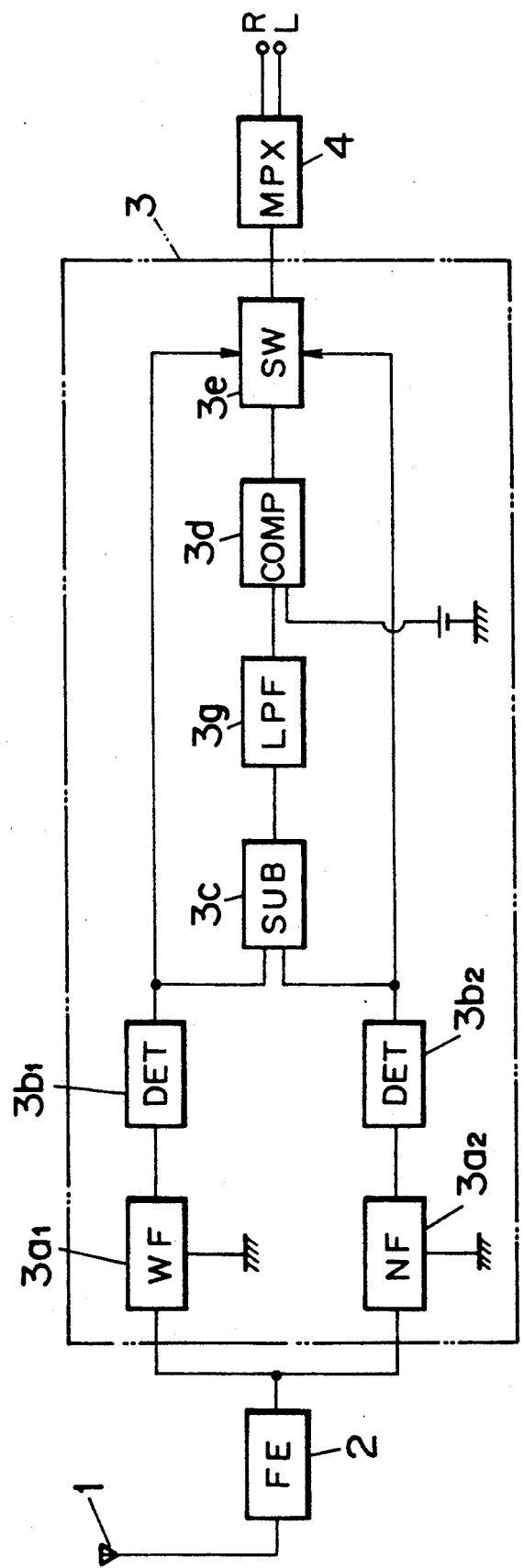
FIGS. 4A and 4B show a third embodiment.
Figure 4B:
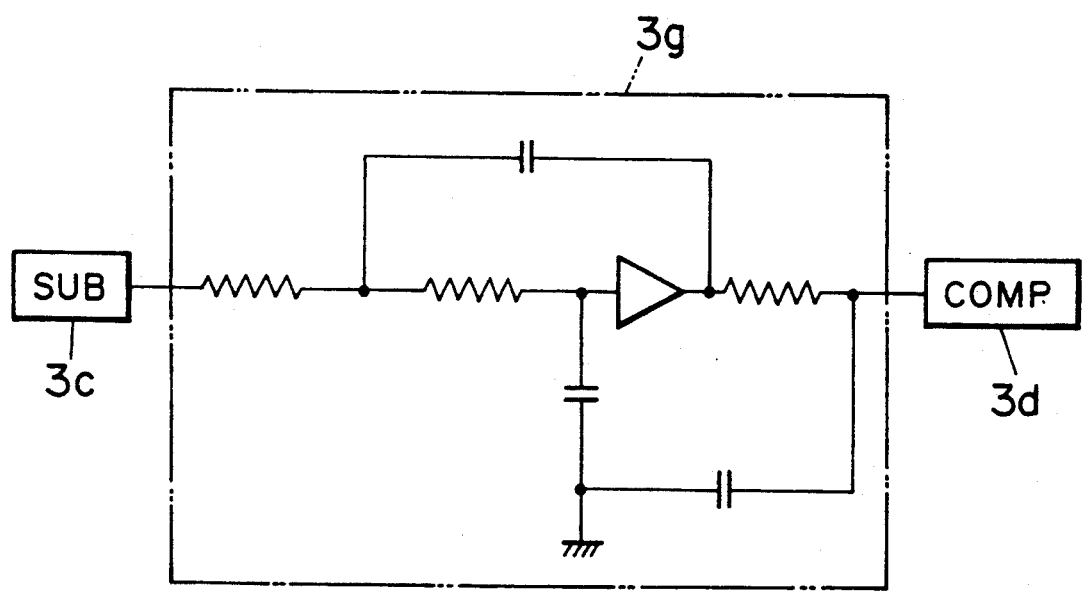

FIG. 4A shows a third embodiment. The third embodiment differs from the first embodiment in that a low pass filter 3g, as shown in FIG. 4B, is connected between the subtracter 3c and the comparator 3d. The low-pass filter 3g takes the form of a third order active filter having a maximum flat low-pass characteristic. In FIG. 4A, the wide filter 3a1 differs in delay time from the narrow filter 3a2. The difference in delay time causes a difference in output level between the detectors 3b1 and 3b2 without regard to the presence and absence of interference. This difference in output level between the two detectors disturbs the proper detection of interference. In the third embodiment, the output of subtracter 3c is supplied to the low-pass filter 3g to remove noise and modulation components before making a decision whether the receiver has interference. The low-pass filter rejects the noise and the difference in detector outputs but passes the interference component whose energy spectrum lies below one kilohertz. The differences in frequency characteristic and delay time characteristic between the wide and narrow filters 3a1 and 3a2 are significant in a high audio frequency range. Therefore, inserting the low-pass filter 3g will not adversely affect the detection of interference.

Fourth embodiment

Figure 5:
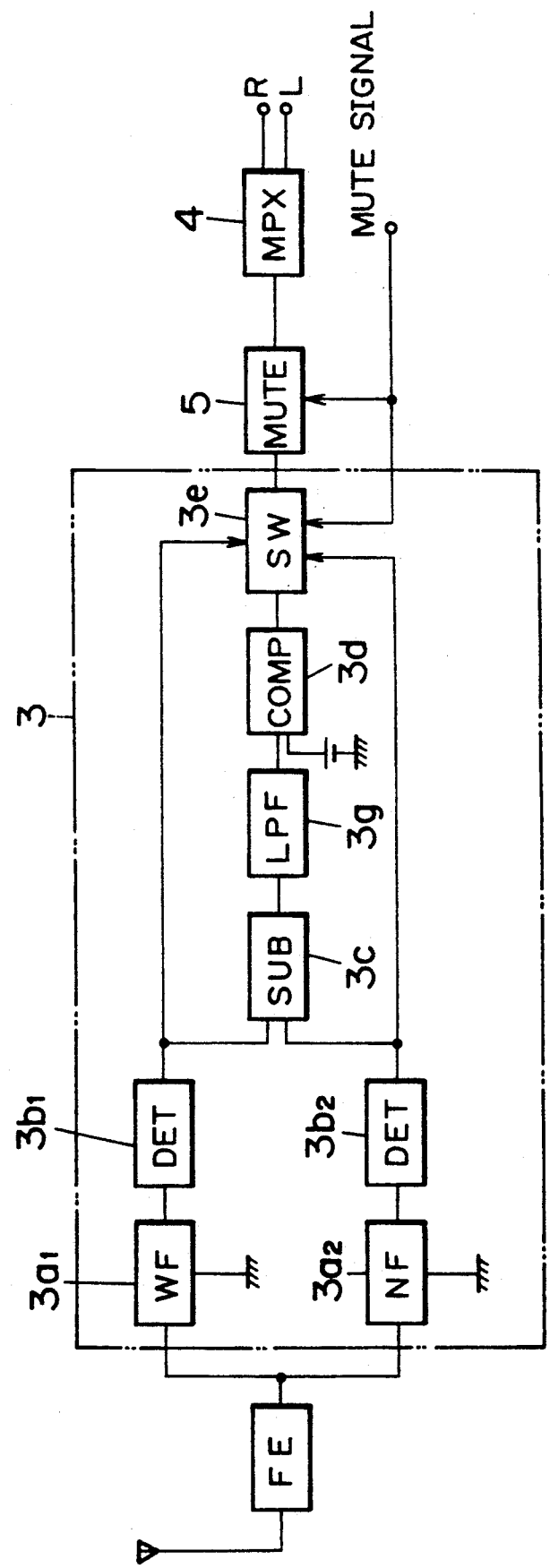
FIG. 5 shows a fourth embodiment of the invention.

FIG. 5 shows a fourth embodiment of the invention. The fourth embodiment differs from the third embodiment in that the switch 3e of FIG. 4A is controlled by a muting signal as well and a muting circuit 5 is provided between the multiplex circuit 4. That is, when the user depresses a seek button, a muting signal is supplied to the muting circuit 5 so that noise is not outputted from a speaker during the seek operation.

During the seek operation, the muting signal is supplied to the muting circuit 5 and switch 3e. The switch 3e is switched to the side of the detector 3b1(i.e., wide filter 3a1) and remains positioned there. During the time when the muting signal is being supplied to the muting circuit, the muting circuit 5 continues to mute the output of switch 3e. Since the switch 3e is positioned to the side of the wide filter, the selection of stations is performed smoothly. When the selection of stations has been completed, the muting signal is no longer supplied and the switch 3e remains at the position of wide filter 3a1. If the receiver is interfered with by an adjacent station during the seek operation, then the switch 3e is instantly switched to the narrow filter so that interfering audio output is not significantly heard. The switch that remains positioned at the wide filter 3a1 eliminates the problem due to the fact that the time required for switching from narrow filter to wide filter is longer than that required for switching from wide filter to narrow filter.

Fifth embodiment

Figure 6:
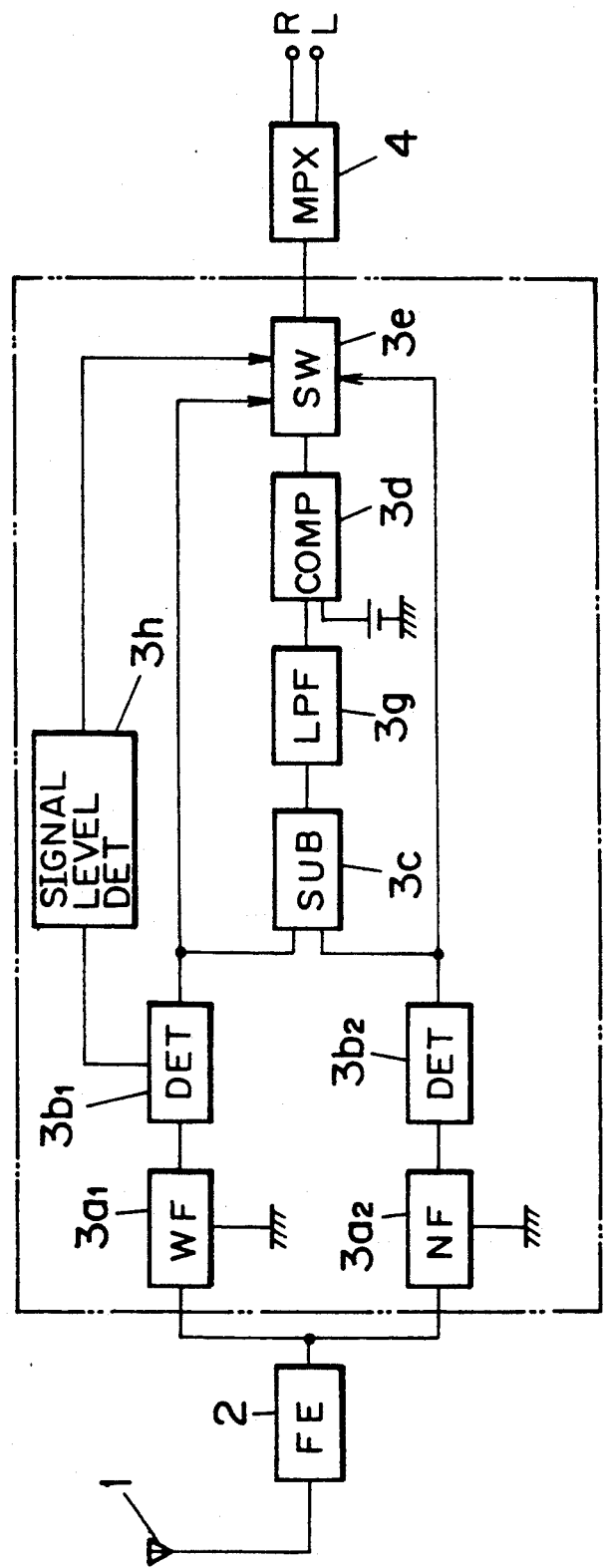
FIG. 6 shows a fifth embodiment of the invention.
Figure 7:
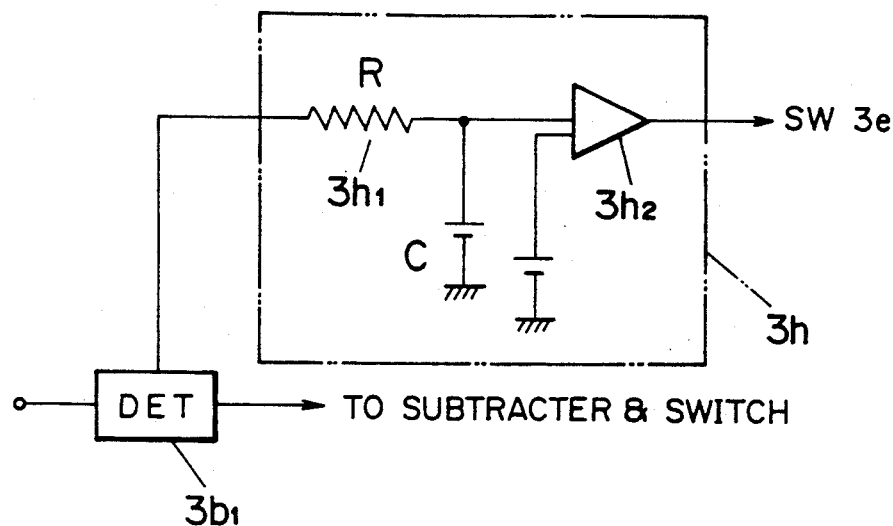
FIG. 7 shows the detail of the detecting circuit 3h.

FIG. 6 shows a fifth embodiment of the invention. In the fifth embodiment, a signal-level detecting circuit 3h is added which receives the output of the S-meter in the detector 3b1 and outputs a signal for driving the switch 3e. FIG. 7 shows the detail of the detecting circuit 3h. A low-pass filter 3h1 is formed of a resistor R and a capacitor C. The output of the low-pass filter 3h1 is supplied to the comparator 3h2 which in turn compares the output of filter 3h1 with a reference voltage. When the input to the comparator 3h2 is lower than the reference voltage, the comparator 3h2 outputs a high level.

Figure 8:
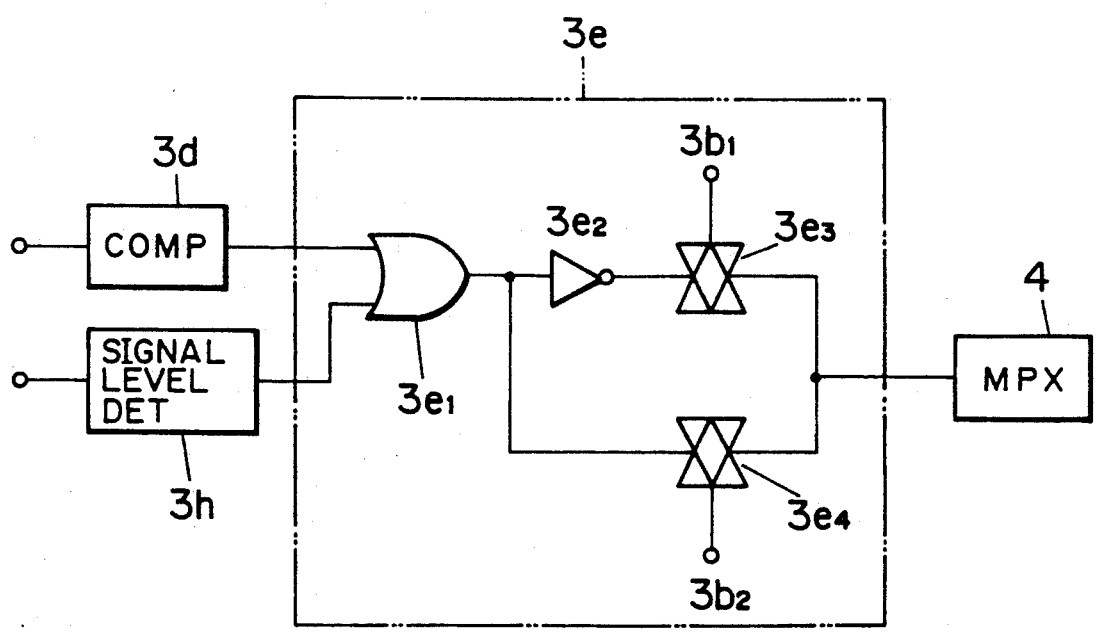
FIG. 8 shows the detail of the switch 3e.

FIG. 8 shows the detail of the switch 3e. An OR circuit 3e1 receives the output of the comparator 3d and the output of the signal-level detecting circuit 3h to provide an ORed output.

The operation of the switch 3e will be described as follows: When the field intensity of the station currently being received decreases, the output of the S-meter in the detector 3b1 also decreases. The output of S-meter goes through the low-pass filter 3h1 by which the signal is smoothed, and is then inputted to the comparator 3h2.

If the input level to the comparator 3h2 is lower than the reference voltage, then the comparator 3h2 outputs a high level. Thus, the OR circuit 3e1 outputs a high level which causes an analog switch 3e4 to close and an analog switch 3e3 to open. Thus, the output of detector 3b2 is supplied through the switch 3e4 to the multiplex circuit 4.

If the input to the comparator 3h2 is higher than the reference voltage, then the comparator 3h2 outputs a low level. Thus, the output of comparator 3d determines the output of the OR circuit 3e1.

If the output of the comparator 3d is a high level which represents that the receiver is interfered with by an adjacent station, the analog switch 3e3 is opened and analog switch 3e4 is closed, thereby directing the output of detector 3b2 to the multiplex circuit 4 via the switch 3e4.

If the input to the comparator 3h2 is higher than the reference voltage and the output of the comparator 3d is a low level, then the desired station received is normal. In such case, the switch 3e4 is opened and the switch 3e3 is closed, thereby directing the output of detector 3b1 to the multiplex circuit 4 via the switch 3e3. If the field intensity of the desired station is low while at the same time the receiver is interfered with by an adjacent station, the output of the comparator 3d overrides the signal-level detecting circuit 3h such that the switch 3e is switched to the position of detector 3b2.

Sixth embodiment

Figure 9:
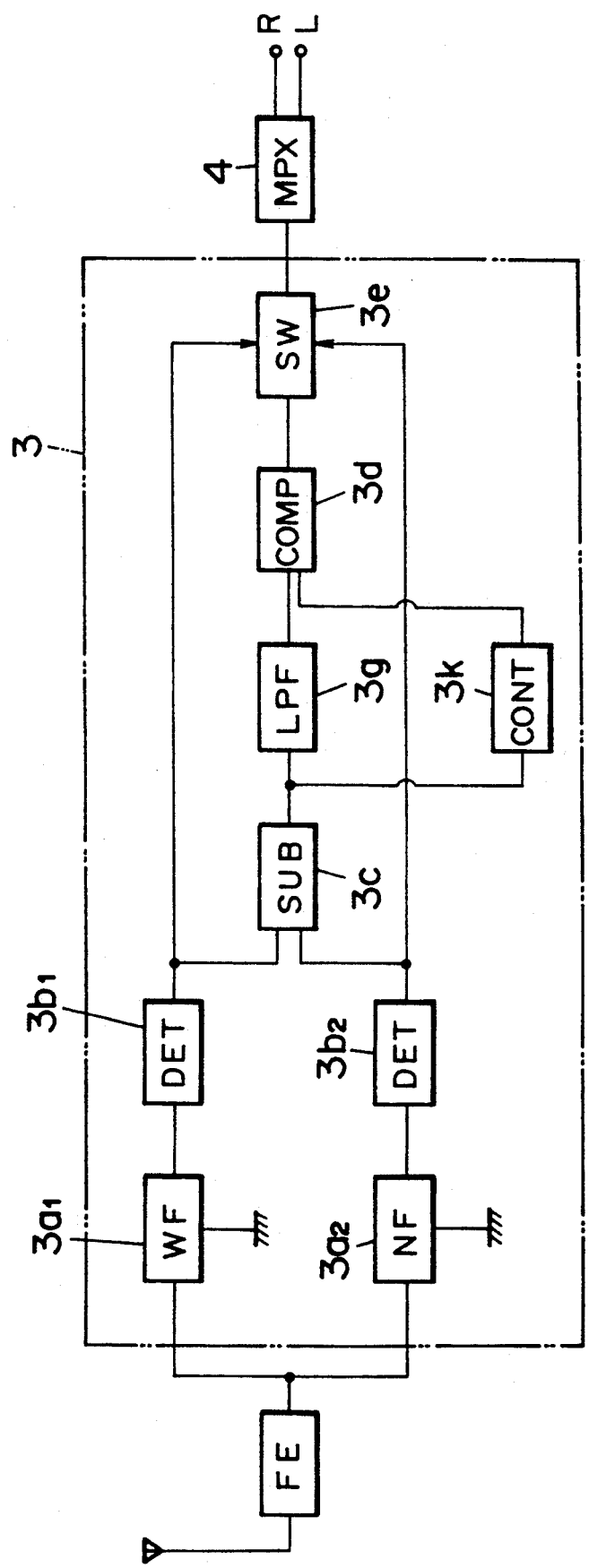
FIG. 9 shows a sixth embodiment of the invention.

FIG. 9 shows a sixth embodiment of the invention. A sixth embodiment differs from the third embodiment in FIG. 4A in that a controller 3k is placed between the subtracter 3c and the comparator 3d. The controller 3d outputs a reference level to the comparator 3d. The reference level varies in accordance with the output of the subtracter 3c. If the output of the subtracter 3c contains pulse noise such as ignition noise, then the controller 3k detects the pulse noise so as to output a higher reference level to the comparator 3d. Thus, the sensitivity of receiver to detect interference is decreased for a time period during which pulse noise is occurring, thus preventing the malfunction of the interference-detecting operation due to pulse noise. The pulse noise occurs for a time period much shorter than the time period when the receiver is interfered with and thus, the higher reference level lasts for only a short time. Therefore, even if the pulse noise occurs at the same time as the receiver is interfered with, the ability of the receiver to detect interference is not significantly affected.

Seventh embodiment

Figure 10:
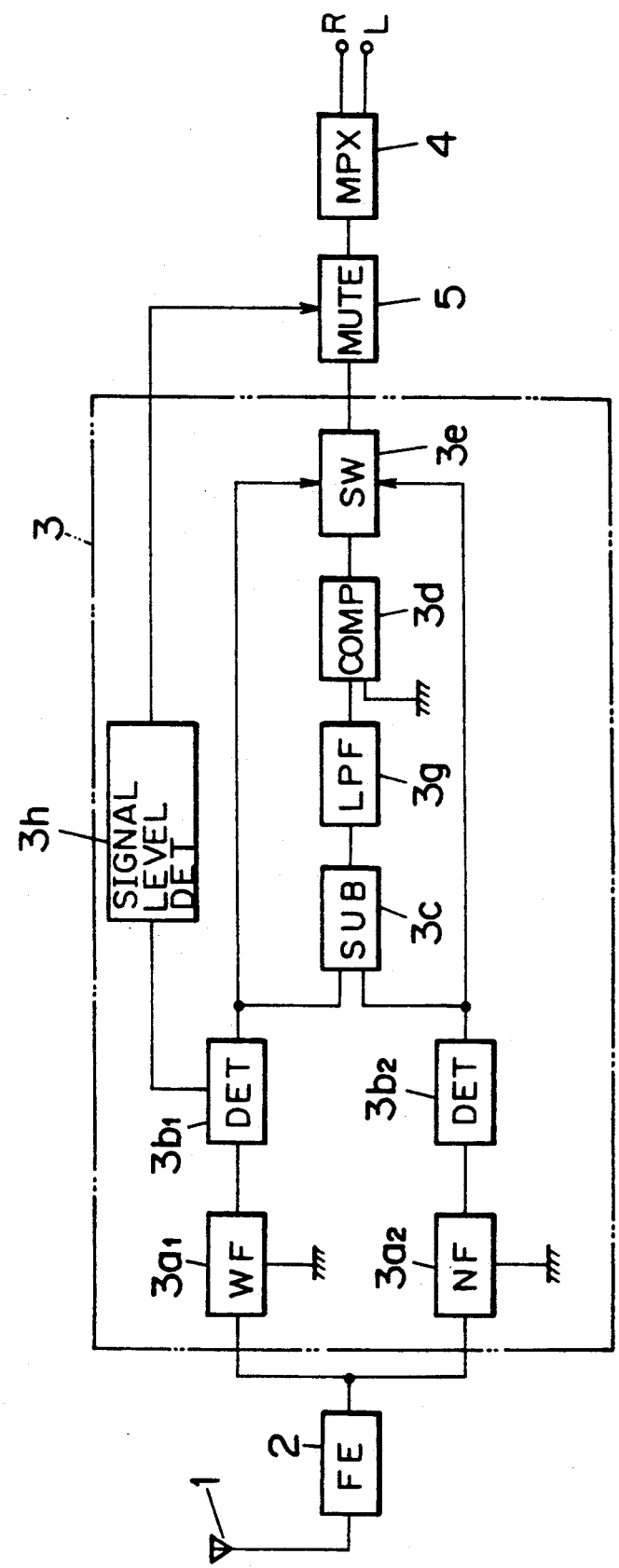
FIG. 10 shows a seventh embodiment of the invention.

FIG. 10 shows a seventh embodiment of the invention. The seventh embodiment differs from the fourth embodiment in that a signal-level detecting circuit 3h is provided which receives the output of the S-meter(not shown) in the detector 3b1 so as to output a signal for driving the muting circuit 5.

The operation of the seventh embodiment will be described as follows: When the field intensity of the station currently being received decreases, the output of the signal-level detecting circuit is supplied to the muting circuit 5 which in turn attenuates the signal to the multiplex circuit 4 in accordance with the output of the S-meter. Thus, the noise in the demodulated signal is also attenuated. This prevents the user from hearing the receiver output containing a large amount of noise when the field intensity of the station currently being received.

In practice, the wide and narrow filters 3a1 and 3a2 each have an amplifier preceding to an internal filter circuit. The amplifier in the narrow filter 3a2 is designed to have a gain greater than that of the wide filter 3a1.

Eighth embodiment

Figure 11:
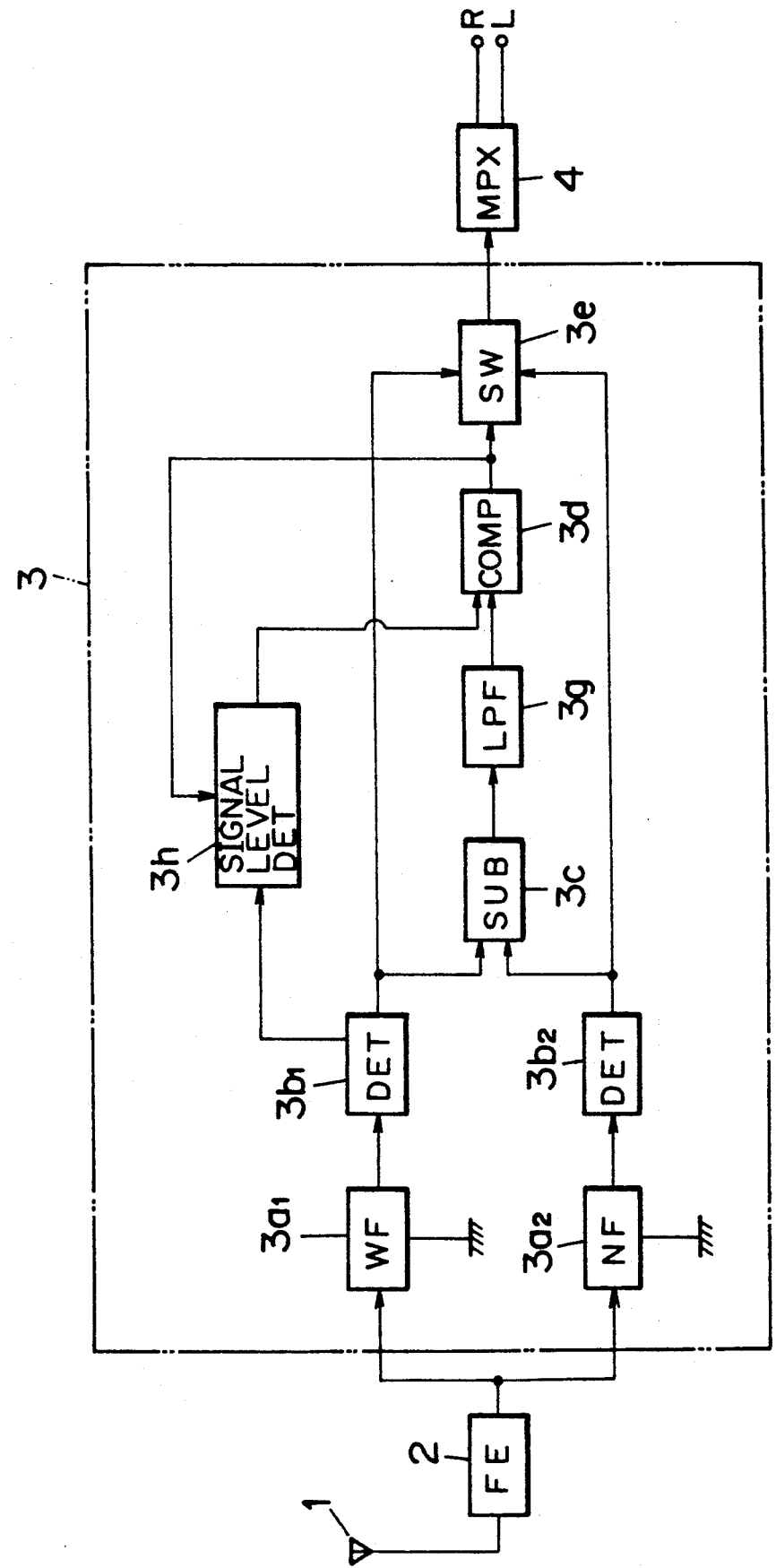
FIG. 11 shows an eighth embodiment of the invention.

FIG. 11 shows an eighth embodiment of the invention. The signal-level detecting circuit 3h receives the output of the detector 3b1 and outputs the reference level for the comparator 3d. When the field intensity of the signal currently being received drops below a predetermined level, the signal-level detecting circuit 3h holds the reference level while the switch 3e is switched to the position of detector 3b2.

Thus, even if the output of the S-meter in the detector 3b1 varies due to the fact that the receiver is receiving an r−f signal through multipath noise when the vehicle is running or the frequency currently being received is overmodulated, the malfunction due to overmodulation and multipath noise is prevented.

Ninth embodiment

Figure 12:
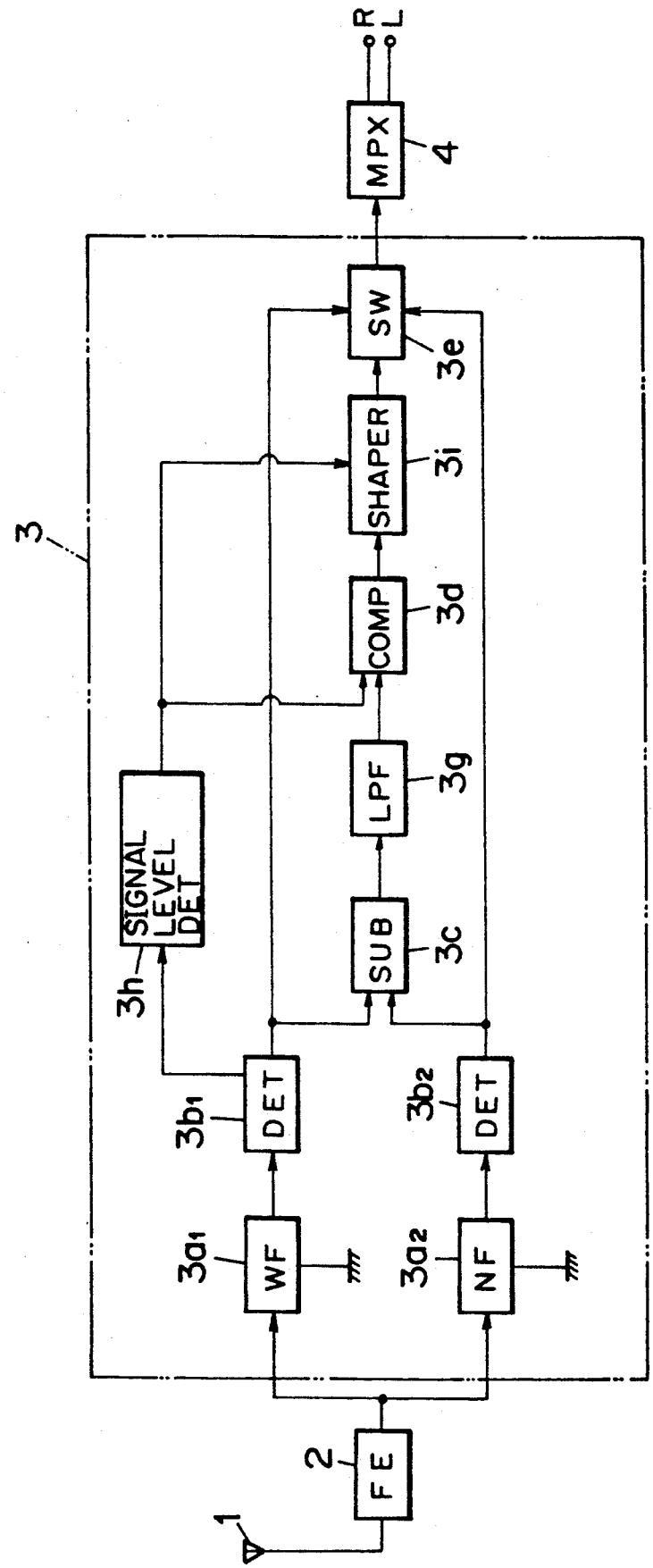
FIG. 12 shows a ninth embodiment of the invention.

FIG. 12 shows a ninth embodiment of the invention. In the ninth embodiment, a shaper 3i is inserted between the comparator 3d and switch 3e of the eighth embodiment. The signal-level detecting circuit 3h receives the output of the S-meter in the detector 3b1 and outputs a reference level for the comparator 3d in accordance with the field intensity of the station currently received. If the output of the S-meter in the detector 3b1 varies due to the fact that the receiver is receiving an r−f signal through multipath noise when the vehicle is running or the frequency currently being received is overmodulated, then the output of the S-meter 3h frequently drops for a short time decreasing the reference level of the comparator 3d. Thus, the problem is eliminated which the malfunction due to overmodulation and multipath noise are misinterpreted as being caused by interference. The shaper 3i receives the output of the signal-level detecting circuit 3h and supplies a delayed output to the switch 3e, causing a longer time required for the switch 3e to shift from the narrow filter side to wide filter side. The longer time thus prevents frequent switching between the two filters to enhance stability of the receiving condition.

Tenth embodiment

Figure 13:
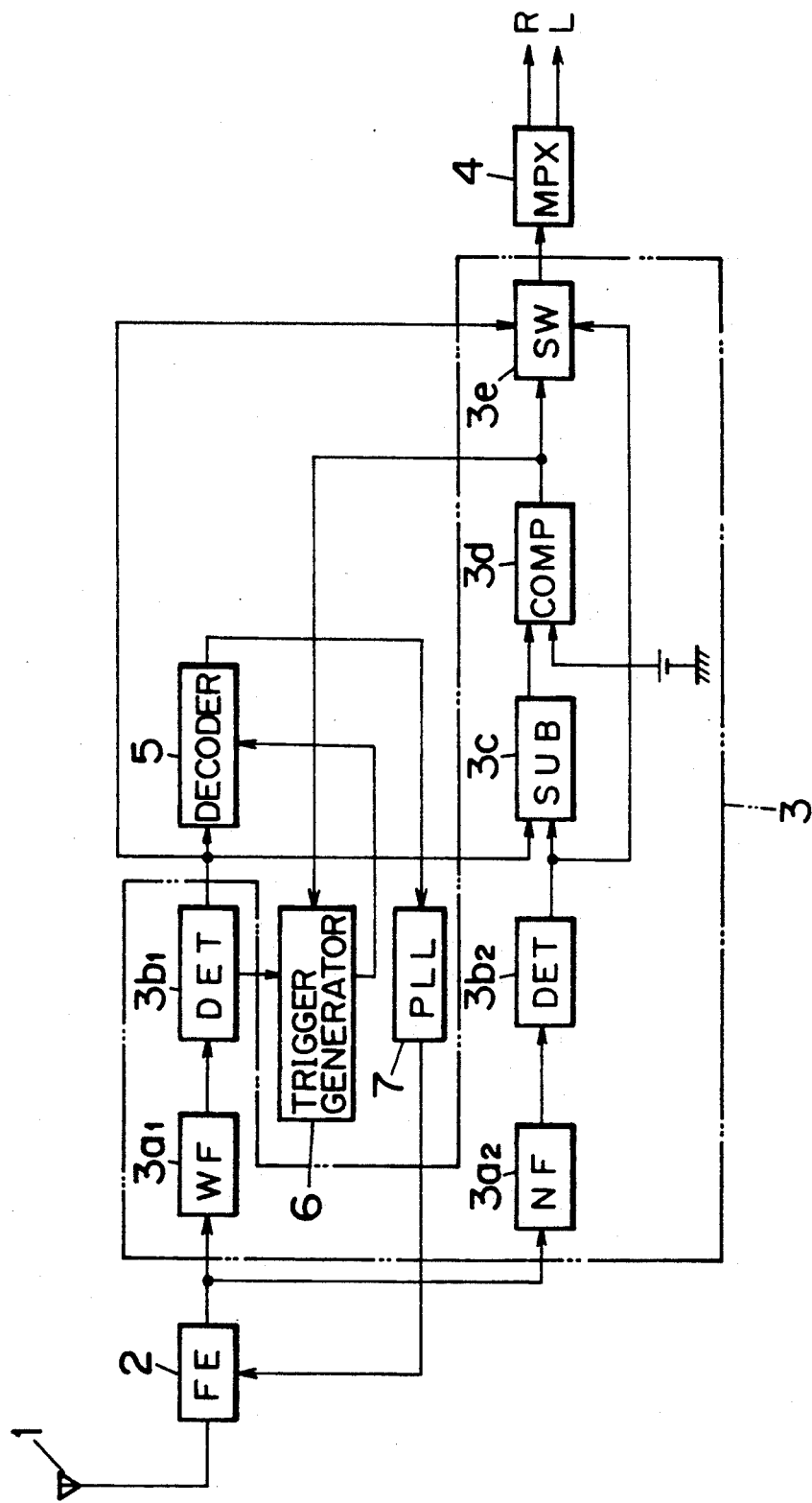
FIG. 13 shows a tenth embodiment of the invention.
Figure 14:
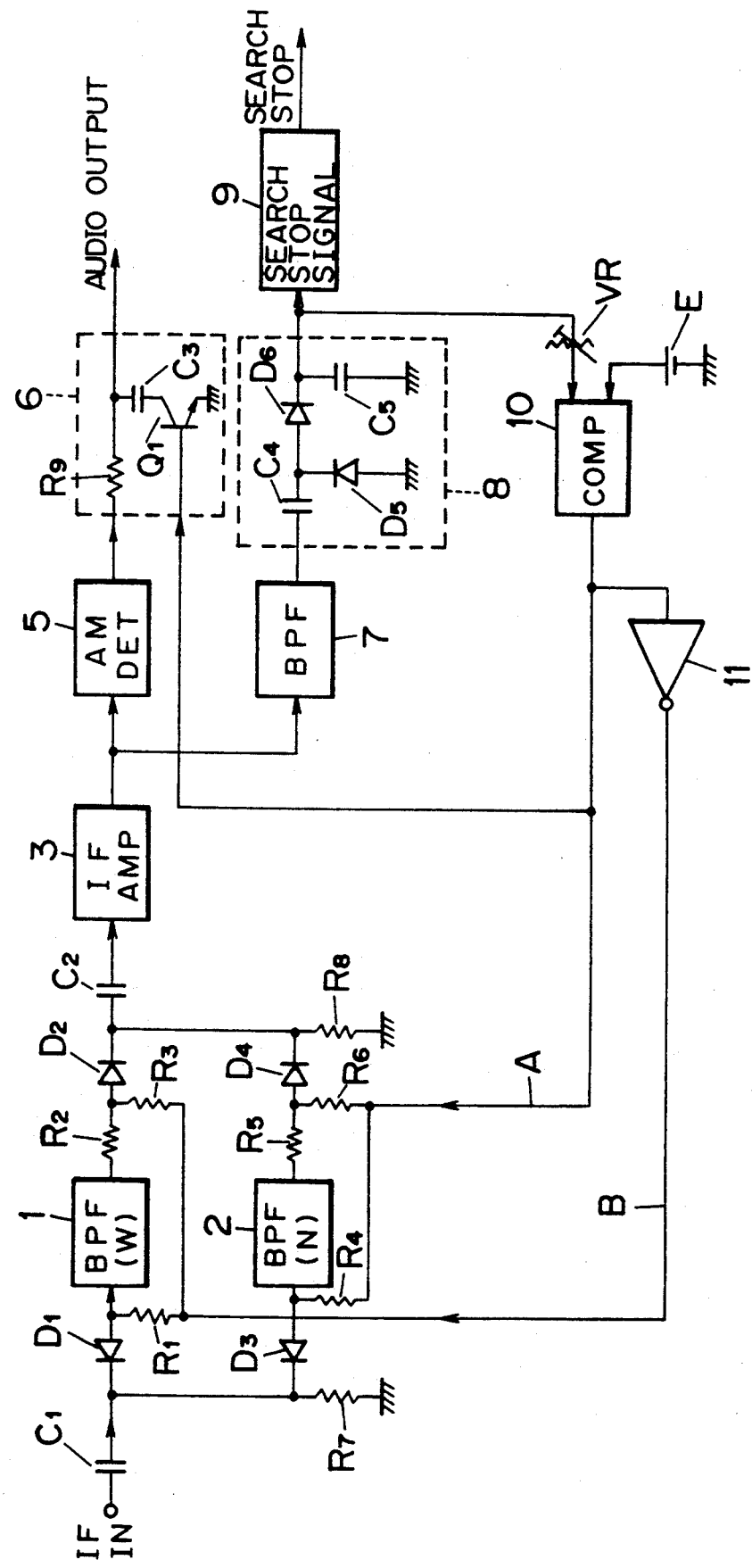
FIG. 14 shows a prior art receiver.
Figure 15:
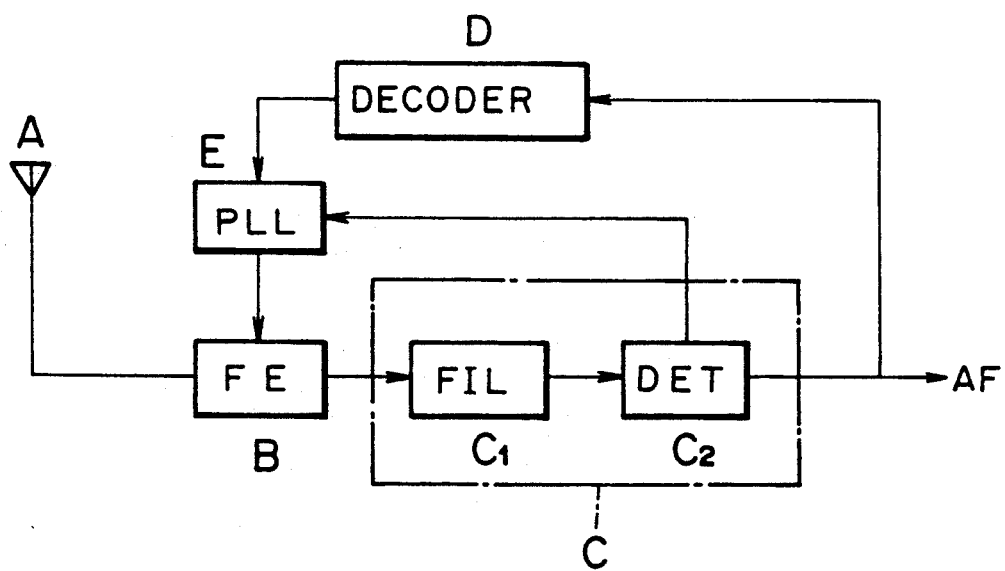
FIG. 15 shows a prior art RDS receiver.

FIG. 13 shows a tenth embodiment of the invention. A conventional RDS decoder 5 is connected with the output of the detector 3b1. A PLL circuit 7 is connected to the output of the decoder 5. The output of the S-meter in the detector 3b1 is supplied to a trigger generator 6 which generates a triggering pulse to the PLL 7 when the S-meter output decreases below a predetermined level.

The FM radio wave through the antenna is selected and amplified by the front end 2. The output of the front end 2 is supplied to the detector 3b1 via the wide filter 3a1 as well as to the detector 3b2 via the narrow filter 3a2. The outputs of the respective filters are demodulated by the detectors 3b1 and 3b2, respectively, and are supplied to the subtractor 3c. If the receiver is not interfered with by an adjacent station, the outputs of the wide filter and the narrow filter are substantially the same and the output of subtractor 3c is small. Thus, the comparator outputs no signal and the switch 3e is shifted to the side of detector 3b1 directing the output of the detector 3b1 to the multiplex circuit 4.

If the receiver is interfered with by adjacent station, an interference appears on the signal waveform from the detector 3b1 as shown in FIG. 2A. However, no interference appears on the signal waveform from the narrow filter 3a2. Thus, the subtractor subtracts one signal from the other to produce the difference between the two signals, which in turn is supplied to the comparator 3d. The comparator compares the output of subtractor 3c with the reference level and outputs a high level signal if the output of the subtractor 3c is greater than the reference level. The high level signal causes the switch 3e to shift to the side of narrow filter to direct the output of detector 3b2 to the multiplex circuit 4.

When the field intensity of the station currently being received decreases, the output of the S-meter in the detector 3b1 also decreases causing the trigger generator 6 to output a triggering signal to the PLL circuit 7. Meanwhile, the RDS decoder outputs in response to the triggering signal, one of the frequencies of the network stations to the PLL circuit 7 which in turn generates a local frequency to receive the new network station. This allows the user to listen to the same program subsequently.

If the S-meter output does not decrease whereas the field intensity of the station currently being received decreases, the receiver operates in a similar manner as the above described case.

What is claimed is:

1. A radio receiver comprising:
   a wide filter and a narrow filter for receiving an output of a front end and for outputting intermediate frequency signals;
   a first detector for receiving the intermediate frequency signal from said wide filter and a second detector for receiving the intermediate frequency signal from said narrow filter, said first and second detectors demodulating the intermediate frequency signals to output first and second demodulated signals;
   a subtractor for outputting a difference between said first and second demodulated signals;
   a switch being switched to a first position for directing said first demodulated signal from said first detector to an output circuit when the difference is below a reference level, and being switched to a second position for directing said second demodulated signal from said second detector to the output circuit when the difference is above the reference level.

2. A radio receiver according to claim 1, wherein said receiver further includes a delay circuit inserted between said subtractor and said first detector.

3. A radio receiver according to claim 1, wherein said receiver further includes a low-pass filter for receiving the output of said subtracter to output a filtered output signal and a comparator for comparing said filtered output signal with the reference level to output a signal for controlling said switch to switch between one of said first and second positions.

4. A radio receiver according to claim 3, wherein said switch is switched to said first position in response to an external signal during a seek operation of the receiver, said switch being switched to said second position in response to the output of said comparator when the receiver experiences interference due to an adjacent station during the seek operation.

5. A radio receiver according to claim 3, wherein said receiver further includes a signal-level detecting circuit coupled to said first detector and said switch, said signal-level detecting circuit outputting a signal for controlling said switch to direct the output of said second detector to the output circuit when a field intensity signal of a frequency currently being received is below a predetermined level.

6. A radio receiver according to claim 3, wherein said receiver further includes a controller coupled to said subtracter and said comparator, said controller receiving the output of said subtracter to detect pulse noise therein and supplying said comparator with said reference level in accordance with said pulse noise.

7. A radio receiver according to claim 3, wherein said receiver further includes a muting circuit inserted between said switch and the output circuit, and a signal-level detecting circuit for outputting a signal for causing said muting circuit to attenuate a signal therethrough when a field intensity signal of a frequency received is below a predetermined level.

8. A radio receiver according to claim 3, wherein said receiver further includes a signal-level detecting circuit coupled to said first detector and said comparator, said signal-level detecting circuit supplying said comparator with the reference level in accordance with a field intensity signal of a received frequency, said signal-level detecting circuit holding the reference level when said switch is switched to said second position.

9. A radio receiver according to claim 3, wherein said receiver further includes a signal-level detecting circuit coupled to said first detector and said comparator, said signal-level detecting circuit supplying said comparator with the reference level in accordance with a field intensity signal of a received frequency, said receiver further includes a shaper for receiving the output of said comparator and outputting a delayed signal to said switch.

10. A radio receiver according to claim 1, wherein said receiver further includes a trigger generator connected to said first detector for outputting a trigger signal when a field strength signal of a received frequency is below a predetermined level and a decoder for storing receiving frequency data therein and for outputting said data in response to said trigger signal so as to receive an alternative station.

* * * * *